United States Patent [19]

Rivera et al.

[11] Patent Number: 5,030,028

[45] Date of Patent: Jul. 9, 1991

[54] HANDRAIL DRIVE WHEEL MOUNT ASSEMBLY

[75] Inventors: James Rivera, Bristol; Lance Lavender, Enfield, both of Conn.

[73] Assignee: Otis Elevator Company, Farmington, Conn.

[21] Appl. No.: 582,565

[22] Filed: Sep. 14, 1990

[51] Int. Cl.⁵ .............................................. B25G 3/00
[52] U.S. Cl. ..................................... 403/16; 403/259; 403/261
[58] Field of Search .................. 403/16, 259, 260, 261

[56] References Cited

U.S. PATENT DOCUMENTS 4,144,755  3/1979  Palloch ............................ 403/16 X
4,494,889  1/1985  Thompson ....................... 403/16 X
4,901,839  2/1990  Johnson et al. ..................... 198/335

Primary Examiner—Andrew V. Kundrat
Attorney, Agent, or Firm—William W. Jones

[57] ABSTRACT

Handrail drive wheels on escalators and moving walkways are subjected to high stresses due to the pressures which are generated by the drive wheels in order to move the handrails. The operational stresses on the drive wheels require that they be securely mounted on their drive shafts. This mount assembly provides secure wheel-shaft coupling, while enabling the drive wheel to be easily removed from the drive shaft for servicing without the need to use any specialized tools. The wheels are provided with internal jack screws that can be manipulated with an Allen wrench to dislodge the wheel from the drive shaft.

4 Claims, 1 Drawing Sheet

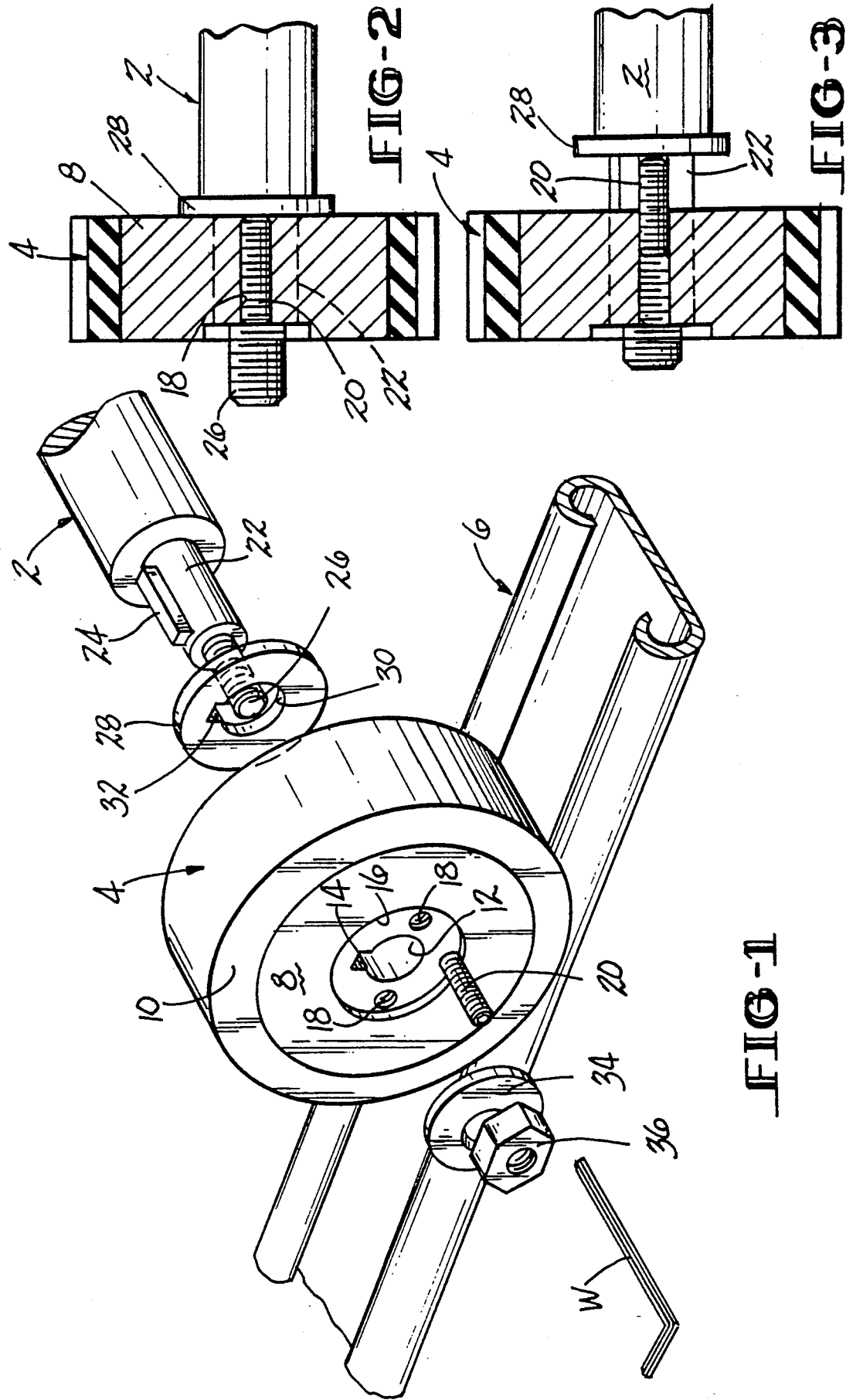

HANDRAIL DRIVE WHEEL MOUNT ASSEMBLY

DESCRIPTION

1. Technical Field

This invention relates to an escalator or moving walkway handrail drive assembly, and more particularly to a drive wheel-drive shaft mount which enables easy removal of the drive wheel from the drive shaft.

2. Background Art

U.S. Pat. No. 4,901,839 granted Feb. 20, 1990 to G. E. Johnson, et al. discloses an escalator or moving walkway handrail drive which is self adjustable so as to apply greater pressure to the handrail responsive to increased resistance to movement of the handrail. The drive assembly includes a pair of drive wheels which engage the handrail via a nip formed between the drive wheels. The wheels are mounted on drive shafts which also carry sprockets on which a chain is entrained. A powered sprocket moves the chain so as to cause the drive shafts and drive wheels to rotate whereby the handrail is forced through the drive wheel nip.

Typically, in the above-noted type of handrail drive, and in similar handrail drives which include pressure drive wheels, the drive wheels are keyed and pressed onto the drive shafts during factory assembly. Due to the high driving forces imposed on the drive, a liquid bonding material of the type sold under the trademark "Loctite" is used to bond the wheel to its shaft. At the same time, the dynamic nature of the driving action, and the pressures encountered by the system, maintenance of the drive requires that the drive wheels be removed from the drive shafts from time to time. Removal of the wheels is obviously difficult, and requires specialized tools such as bearing pullers, or the like, which can damage the drive wheels.

DISCLOSURE OF THE INVENTION

This invention relates to a mounting assembly for securing the drive wheels to their drive shafts in such a manner that the wheels can be removed from the shafts without using complex tools, and without risking damage to the wheels or shafts. The wheel is keyed to and pressed onto the drive shaft in the same manner as in the prior art, and secured to the shaft with the Loctite brand adhesive. The hub of the wheel is provided with a plurality of drilled and tapped through passages which are parallel to the axis of rotation of the wheel and drive shaft. Set screws are threaded into the tapped through passages, and are contained within the confines of the wheel hub when the drive assembly is in normal use. A seating disk may also be mounted on the drive shaft adjacent to the drive wheel. The disk provides a surface against which the set screws can bear when the wheel is removed from the shaft. A conventional washer and lock nut assembly is used to fasten the wheel to the drive shaft. To remove the wheel from the drive shaft, the nut and washer are removed from the shaft, and the set screws are screwed into the wheel hub and against the disk. The set screws thus operate as jack bolts and are operable to push the wheel off of the drive shaft. After the wheel is removed from the drive shaft, the set screws are readjusted to their retracted positions so that the wheel can be remounted on the drive shaft. The set screws can be manipulated with a common Allen wrench.

It is therefore an object of this invention to provide an assembly for mounting a wheel on a drive shaft which allows removal of the wheel from the shaft without the use of complex tools.

It is a further object of this invention to provide an assembly of the character described which enables removal of the drive wheels from the drive shafts without damaging either element.

These and other objects and advantages of the invention will become more readily apparent to those skilled in the art from the following detailed description of the invention when taken in conjunction with the accompanying drawings, in which:

BRIEF DESCRIPTION OF THE DRAWINGS

FIG. 1 is an exploded perspective view of a preferred embodiment of the mounting assembly of this invention;

FIG. 2 is a fragmented side sectional view of the shaft and wheel showing the position of the jack bolt set screws preparatory to removal of the wheel from the shaft; and FIG. 3 is a sectional view similar to FIG. 2 but showing how the set screws operate to push the wheel off of the drive shaft.

BEST MODE FOR CARRYING OUT THE INVENTION

Referring now to FIG. 1, there is shown the handrail drive shaft denoted generally by the numeral 2, and a drive wheel denoted generally by the numeral 4, and the handrail is denoted by the numeral 6. The drive wheel 4 has a central hub 8 formed from steel and an outer sleeve 10 of rubber which contacts the handrail 6. A through bore 12 with a key passage 14 is formed on the axis of the wheel 4, and a countersunk recess 16 is formed about the bore 12. Through passages 18 are drilled and tapped in the countersink 16 on either side of the bore 12. Setscrews 20 are threaded into the passages 18. The drive shaft 2 has a reduced diameter boss 22 with a key 24 sized to snugly fit into the bore 12 and keyway 14. The outer end of the shaft 2 is threaded at 26. A ring 28 having a central opening 30 with a keyway 32 fits on the boss 22 to form a seat or reaction surface for the setscrews 20 as is described below. A washer 34 fits in the countersink 16 and a nut 36 is tightened onto the end 26 of the shaft 2 to secure the wheel 4 to the shaft 2. During assembly, the setscrews 20 are threaded into the passages 18 so as to be completely recessed in the wheel hub 8. The ring 28 and wheel 4 are then pressed onto the adhesive coated boss 22, and the washer 34 and nut 36 are used to secure the wheel 4 in place.

As seen in FIG. 2, when the wheel 4 is fully seated on the boss 22, the setscrews 20 are retracted into the wheel hub 8 and do not touch the ring 28. When the washer 34 and nut 36 are removed, the setscrews 20 can be accessed through the passages 18 with an Allen wrench W, as shown in FIG. 1. To remove the wheel 4 from the drive shaft 2, the setscrews 20 are screwed into the passages 18 until they encounter the ring 28. Further manipulation of the setscrews 20 will cause the wheel 4 to be pushed off of the boss 22, as shown in FIG. 3. Thus the setscrews act as jack bolts to push the wheel 4 off of the drive shaft 2.

It is readily apparent that the use of the setscrews to back the wheel off of the drive shaft protects the wheel against damage, and allows the wheel to be easily removed from the drive shaft without using any complex tools. A simple Allen wrench will suffice. When the wheel is to be reattached to the shaft, the setscrews are simply backed into the wheel hub. The assembly of this invention allows easier and more frequent maintenance and upkeep of the handrail drive mechanism.

Since many changes and variations of the disclosed embodiment of the invention may be made without departing from the inventive concept, it is not intended to limit the invention otherwise than as required by the appended claims.

What is claimed is:

1. A mounting assembly for connecting a drive wheel to a drive shaft which allows easy removal of the drive wheel from the drive shaft, said mounting assembly comprising:
    a) a hub on the drive wheel which has an axial thickness substantially equal to the axial thickness of the wheel;
    b) a central opening in said hub for receiving the drive shaft;
    c) a plurality of threaded passages extending through said hub on opposite sides of said central opening;
    d) a threaded screw mounted in each of said threaded passages, each threaded screw having an axial dimension which is no greater than the axial thickness of said hub; and
    e) a radial means on the drive shaft adjacent to the drive wheel for forming a fixed surface against which said screws can be thrust, whereby rotation of said screws toward said radial means is operable to push said drive wheel away from said radial means to initiate removal of said drive wheel from said drive shaft.

2. The mounting assembly of claim 1 wherein said radial means is a ring mounted on said drive shaft adjacent to said drive wheel.

3. The mounting assembly of claim 1 wherein said hub has a counterbore surrounding said central opening; said threaded passages opening into said counterbore; and means secured to said drive shaft and disposed in said counterbore to overlie and cover said threaded passages.

4. The mounting assembly of claim 1 wherein said drive shaft is provided with an adhesive coating to enhance securement of said drive wheel to said drive shaft.

* * * * *